Patented Dec. 21, 1948

2,456,643

UNITED STATES PATENT OFFICE 2,456,643

LIGHTWEIGHT MATERIAL AND ITS PREPARATION

Henry Napier, Joliet, Ill., assignor to F. E. Schundler & Co., Inc., Joliet, Ill., a corporation of Illinois No Drawing. Application June 12, 1943, Serial No. 490,634

9 Claims. (Cl. 106—86)

This invention relates to a light weight material for insulation and other purposes and, among other objects, aims to provide by a simple and inexpensive process a light weight mineral material adapted among other uses to form an efficient and inexpensive thermal insulation. This application is a continuation in part of my co-pending application, Serial Number 402,997.

The nature of the invention may be readily understood by reference to one illustrative product and a method of manufacture thereof embodying the invention.

Among other uses the illustrative product may be molded to form a mineral insulation particularly adapted for industrial and analogous uses where moderately high temperatures (up to 1400° F.) are encountered.

The most common molded insulation heretofore used for industrial purposes and the like is the product known as 85% magnesia, that is, 85% basic magnesium carbonate and 15% asbestos. This product, although it is not adapted for use at temperatures over 600° F. is generally used as a standard of comparison for other molded insulation as regards insulating efficiency, weight, cost, etc. As will presently appear the illustrative insulation is superior to 85% magnesia in insulating efficiency (K factor), strength, hardness, and resistance to abrasion and vibration, and is capable of resisting temperatures up to 1400° F. Its cost of manufacture is less than that of 85% magnesia.

The illustrative material is characterized by a strong, stable and refractory particle of very light weight in relation to its bulk, developed from heavier or denser substances while the latter are in dispersed or separated condition. These substances (which ordinarily tend to segregate or settle) are maintained in such separated or dispersed condition until particles of maximum bulk (in relation to their weight) have been formed. The expression "particle" is used for want of a better term to designate the structures which are formed while the parent substances are maintained in separated condition. The primary structures are so small that their physical shape has not yet been determined. In the aggregate they have a low apparent density and must therefore be bulky in relation to their mass. Chemically, one class of particles are refractory silicates and/or aluminates of calcium.

Various particle forming substances may be employed. In general they are capable of hydrating, reacting, or combining when in free or dispersed condition in the presence of water (and preferably accelerated by heat and even steam under pressure) to form a light weight bulky particle. One such material is Portland cement whose constituents are lime, silica, and alumina which combine to form tricalcic silicate, $3CaO \cdot SiO_2$; tricalcic aluminate $3CaO \cdot Al_2O_3$; and dicalcic silicate, $2CaO \cdot SiO_2$.

In the uses to which Portland cement has heretofore been put, it does not exhibit the property utilized in the present invention, namely, that of forming a bulky light weight particle. It was designed for use as a bonding agent and for that purpose it must hydrate in compressed or confined condition in intimate contact with the particles of aggregate which it is to bond together. Initially, it is a dense material and on hydration forms a dense product. For greater bonding efficiency and strength a minimum amount of water is used to prevent the separation of the constituents by excess of water which would leave substantial areas out of bonding contact with each other when the free water disappeared. In the conventional use of Portland cement, hydration progresses over a long period of time. Such progressive hydration is evidenced not by increase in size of the hydrated particles, but by increase in strength over a long period of time. None of the conventional conditions under which Portland cement has heretofore been used is present in this invention.

While not theoretically perfect for present purposes, Portland cement has the advantage of cheapness, general availability and its end products are quite refractory.

Another light weight refractory particle (comprising calcium silicate) is that formed by the reaction of silica and hydrated lime in the presence of water and accelerated by heat and sometimes steam under pressure. Such a particle when formed in the aforesaid dispersed condition is very light in weight and refractory. Efficiency of reaction and lightness of weight may be promoted by using silica which presents a large surface area in relation to the mass of the silica particle. Diatomaceous earth provides one readily available form of silica which has a very large surface area in relation to particle mass. This greatly increases the surface available for reaction with the lime, thereby increasing efficiency in development of the particle and speed of reaction. The porous condition of the diatomaceous earth is not alone responsible for the lightness of the resulting calcium silicate since the latter is much lighter than the diatomaceous earth. Another suitable form of silica is so-called fly-ash. This also is characterized by a particle having a large surface area in relation to its mass. Finely ground silica if available could also be used for this purpose.

Natural cement and magnesite are other substances from which light weight particles may be developed by hydration when separated or in free condition. Heretofore these materials have been used as cements under the same conditions as Portland cement, i. e., hydration or reaction in close contact, etc., and have exhibited none of the properties utilized in the present invention.

One illustrative substance for maintaining the aforesaid materials in dispersed or separated condition during development of the light weight particles is bentonite whose essential constituent is montmorillonite. Montmorillonite has the general formula (OH)$_{12}$Al$_4$Si$_8$O$_{16}$·NH$_2$O, and is characterized by what is called an expanding lattice. The sheets of the lattice, each of which comprises an arrangement of aluminum, oxygen, and silicon atoms are loosely held together in the direction of one axis and are adapted to be expanded or relatively separated by entry of water between the sheets of the lattice. Bentonite and other materials, hereinafter named have been termed for convenience "dispersing agents," but it is not known whether they function solely to separate the "particles" during formation.

The precise manner in which the bentonite operates is not known. When hydrated in ordinary tap water (which invariably contains electrolytes) it forms floccules, and its action in maintaining separation of the particle forming substances, such as particles of Portland cement, may therefore be wholly mechanical. Or, on the other hand, it may be partly mechanical and partly as a true dispersant. There is some evidence that its action is mechanical, for if an excess of bentonite be used, there is some shrinkage on drying, indicating that the excess of bentonite floccules has held the completely developed light weight particles farther apart than necessary to accommodate their maximum growth. However, bentonite is known as an efficient dispersing agent, and bentonite particles of colloidal size may be present to act as a true dispersant Other evidence of the mechanical separating action of the dispersing agents is that, as explained in my said co-pending application, asbestos and aluminum hydroxide precipitate may be used as dispersing agents. Both can be prepared in such fine dispersion as in effect to form almost a gel in which the particle forming substances are held separated during formation or development. The action of these dispersing agents would seem to be at least partly mechanical.

Another dispersing or separating agent is attapulgite. Attapulgite has the general formula, (OH$_2$)$_4$(OH)$_2$Mg$_5$Si$_8$O$_{20}$·4H$_2$O, but instead of two dimensional sheets or plates as in montmorillonite, attapulgite units have a fibre or rod-shaped structure comprising ribbons which may be considered uni-dimensional in character. Chains of water molecules can lie in the spaces between the ribbons. The action of attapulgite would therefore seem to be analogous to that of bentonite.

It is not known whether the dispersing agents act merely to keep the particle forming substances separated during formation or whether these particles develop on or in combination with the dispersing agent as a nucleus or skeleton. The expanding lattice of bentonite in conjunction with some microscopic study suggests that bentonite may serve in a dual capacity: (1) to maintain the particle forming substances in separated condition during formation and (2) to develop particles in conjunction with Portland cement by adsorption of elements of the latter (such as the calcium atom) between the sheets of bentonite which are thereby permanently wedged apart.

According to a preferred method of making the material, separate slurries of bentonite and Portland cement are prepared. As stated above due to the presence of electrolytes in the tap water, the bentonite particles flocculate on hydration; nevertheless they form a very voluminous dispersion which has very little tendency to settle. The bentonite and Portland slurries are then mixed together and agitated periodically. Agitation counteracts the initial tendency of the heavy cement particles to settle and prevents particles which may have come into contact through failure of the dispersant, from effectively or permanently uniting. Conditions most favorable to development of the most efficient product, that is one having the lowest apparent density (lowest weight per unit volume) are characterized by a plurality of alternate agitation and quiescent or rest periods. The bentonite or other dispersant mainly functions to maintain the separation essential to efficient development of the light weight particles, and agitation as stated above, prevents any permanent uniting of the particles which would interfere with formation of the most efficient product. As the particles develop whether between or in conjunction with the floccules of bentonite as a skeleton or a nucleus, the need for agitation decreases since increase in surface area of the particles resists settling. Doubtless helpful counteraction of settling is produced by upward convection or other currents within the material.

The following procedure may be advantageously used to make a one thousand gallon batch of material. The bentonite slurry comprises 65 pounds of bentonite to 123 gallons of clear water. This mixture is agitated by a high speed mixer for about thirty minutes. The slurry is then diluted by addition of 600 gallons of clear boiling water. The resulting slurry is restored to boiling condition with live steam during which process the liquid is augmented by about 133 gallons of condensed steam. It requires about ten minutes to restore boiling temperature.

The Portland cement slurry is preferably made by using the filtrate resulting from the dewatering of previous batches as presently described. Three hundred forty pounds of Portland cement are added to about 55 gallons of filtrate. The mixture is advantageously agitated with a high-speed mixer for about ten minutes. This assists hydration by thoroughly separating the cement and possibly also results in some further sub-division by attrition. Preferably high early strength Portland cement is used which, because of its fineness or otherwise, hydrates more rapidly.

About one and two-thirds pounds of magnesium sulphate may advantageously be incorporated in each batch of Portland cement slurry to increase hardness and reduce tendency toward settling. The precise manner in which the magnesium salt accomplishes this is not known. The magnesium sulphate is not, however, essential. A satisfactory product can be obtained without it.

The Portland cement slurry is added to the boiling bentonite slurry and the mixture agitated and restored to boiling temperature by reheating. Preferably agitation is continued for only about three minutes, leaving a short interval until boiling actually occurs, whereupon agitation is resumed for about one minute to prevent violent boiling which may ensue because of the additional heat released by the Portland cement.

Following intermixture of the cement and bentonite slurries, there ensues a series of reheating, agitation, and rest periods. In the present case about twenty-five minutes after intermixture, as aforesaid, the batch is reheated e. g. with live steam, and when ebullition is imminent, the mass is agitated mechanically. Agitation, of course, arrests boiling. During boiling, agitation need not be continuous. The duration of actual agitation is about one and one-quarter minutes. A total of about seven agitation and reheating periods of this character may advantageously be employed at increasing intervals. The first four intervals are about twenty-five minutes each and the remaining about thirty minutes each. As stated above, convection currents within the mass doubtless counteract settling even during so-called rest periods, which aid in promoting particle lightness.

When hydrated lime and silica, e. g. diatomaceous earth, are used as particle forming materials in place of Portland cement they may advantageously be employed in the ratio of five parts diatomaceous earth to three parts of lime, and together aggregate about the same weight as that of Portland cement in the above mentioned example. When reacted under steam pressure of about thirty-five to forty pounds, they produce the same volume of light weight particles as is produced by 104% of their aggregate weight of Portland cement.

The completed batch may then advantageously stand for a number of hours (preferably overnight) to secure a still lighter particle by complete hydration or reaction, at least so far as hydration or reaction contributes to the size or bulk of the particle. Further hydration or other alteration of the Portland cement, if any, which may subsequently take place is of a different character since it does not produce a bulkier or lighter particle though it may act as a bonding agent after molding.

Upon completion of particle development, the material is dewatered and filtered if the material be desired in granular or powdered form. Additional procedure presently described is employed if the material is to be molded in block or other forms.

The resulting product contains some functionless hydrated lime, one of the constituents of Portland cement, which serves to add weight. The product may be made still lighter by utilizing the lime, one method for which is to add enough silica (in effective form such as diatomaceous earth or fly ash) to combine with the lime in the presence of moisture and accelerated by heat, to form the calcium silicate particles. The development of these particles takes place while the materials are in dispersed condition as aforesaid. The diatomaceous earth or fly ash may be added either before or after the Portland cement or bentonite slurries have been combined. Agitation should be employed to disperse the diatomaceous earth through the slurry to which it is added. Generally, the hydrated lime comprises about thirty per cent of the Portland cement and the added silica, e. g., in the form of diatomaceous earth, should be added in the ratio of about five parts of the latter to three parts of calcium hydrate.

The material may be further lightened by using higher temperatures to accelerate reaction, e. g., thirty pounds steam pressure. The ensuing greater speed in formation of the light weight particle results either in a larger or bulkier particle or counteracts the interference with free growth by settling during rest periods.

While the resulting product is substantially lighter in weight than that resulting from the Portland cement and bentonite alone, it makes a weaker molded product since nothing remains to develop a bond. For use in a molded product, it is therefore desirable to add a small amount of bonding agent just before molding. I have found that small amounts of bentonite and calcium hydrate form a satisfactory wet and dry bond. The bentonite functions immediately to form a wet bond, and in the drier in the presence of heat and moisture, it reacts with the calcium hydrate to form a dry bond. However, bentonite alone serves well as a dry bond. Not more than twelve to fifteen per cent of bentonite should be added for bonding purposes, and the calcium hydrate should not exceed two or three per cent of the total dry solids. Diatomaceous earth and calcium hydrate in the ratio of five parts of diatomaceous earth to three parts of calcium hydrate may also be used to develop a bond. In either case at the effective temperatures used in the drier (which would not exceed 212° F. at atmospheric pressure), not all of the bentonite or diatomaceous earth reacts with the calcium hydrate. If the product be indurated, i. e., heated under steam pressure, a satisfactory bond may be developed with substantially less bonding material.

In making molded or block material the mass is advantageously reinforced with fibrous material such as asbestos or metal fibre (as described in my co-pending application Serial No. 490,771), and now abandoned or by both. According to one method the fibre is preferably first thoroughly dispersed (in water) before addition to the mass. The degree and duration of agitation necessary adequately to disperse the fibre depends upon the character of the fibre. For example, amosite or so-called African asbestos fibre is a relatively stiff fibre which is readily dispersed and easily maintained in dispersed condition. Chrysotile fibre on the other hand is a soft fibre which is less readily dispersed and tends to segregate even after dispersion.

Of the asbestos fibres amosite is preferable, not only for the foregoing reasons, but because its longer stiff fibres reduce shrinkage in drying of the molded material, and also give a lower K factor. This is also true of metal fibre such as steel wool. However, at the present time chrysotile is more readily available and is satisfactory if adequately dispersed and maintained in dispersion. A satisfactory chrysotile fibre for this purpose has a Canadian grading of 0–8–6–2. The above grading means that no fibre will remain on a one-half inch mesh sieve, eight ounces out of each pound will remain on a four mesh sieve, six ounces out of each pound on a ten mesh sieve and two ounces out of each pound will pass through a ten mesh sieve.

The following is one example of a molded material. For each one thousand gallon batch as above described, about sixty-seven pounds of chrysotile fibre of the above grading is dispersed in water by means of a beater of the paper beater type. The dispersed fiber is then mixed with the previously described batch and prepared for molding. Preferably the mixture is thickened by partial dewatering to minimize segregation of the asbestos, a propensity which characterizes the chrysotile fibre as distinguished from amosite. Thickening may be accomplished in standard thickeners or by molding a small fraction of the batch so as to filter out the water in the molded portion and then returning the dewatered molded material to the batch and thoroughly mixing it with the batch. Agitation is used during the molding process to counteract any tendency of the chrysotile fibre to segregate.

Generally, it is desirable for reasons of economy to utilize scrap or trimmings from previously molded materials, and such scrap is introduced to the extent of about eighty pounds for each batch. Preferably the scrap is broken down to a slurry with water and mixing prior to addition to the batch. Also a small amount of soap added to the batch (about seven pounds per batch) appears to minimize segregation of the asbestos fibres and shrinkage of the material on molding. Soap, however, is not necessary in the material.

After thoroughly mixing the ingredients added to the original batch and thickening as aforesaid, the material is introduced into molds which preferably have a perforated or porous bottom to permit the liquid to filter out. Air or mechanical pressure may be used to hasten expulsion of the liquid. The material is sufficiently "open" or free to permit rapid drainage of liquid by gravity alone, but for added strength, it is desirable to apply very light pressure during dewatering to consolidate, or interlock the material more effectively. The material may be molded in various shapes and thicknesses such as pipe covering and flat slabs. The material may be removed from the mold just as soon as the liquid has drained out. Although still moist the material is sufficiently strong to permit handling and introduction into the drier on palettes or equivalent supporting surfaces.

The liquid filtrate which contains certain solubles is saved and used as above described in hydrating the Portland cement.

The resulting material has a K factor of .34 at 200° F. mean temperature as compared with .4 for 85% magnesia. At 350° F. mean temperature the product has a K factor of .39 as compared with a .45 K factor for 85% magnesia. In this connection, it should be understood that in actual use the exposed face of the material reaches a much higher temperature than the mean temperature. For example, with a mean temperature of 350° F. the exposed face of insulation one inch in thickness will have a temperature of about 600° F. As regards strength, the material has a modulus of rupture of about fifty pounds as compared with eighteen to forty-five pounds for various types of 85% magnesia. Its weight is about the same as that of 85% magnesia, i. e., twelve to fourteen pounds per cubic foot. Its cost of manufacture is substantially less than that for 85% magnesia because of the relatively low cost of materials and equipment for its manufacture.

Further advantages and economies accrue in the use of the material. Heretofore insulation against temperatures above 600° F. has required the use of a protecting refractory for insulating materials such as 85% magnesia. For this purpose it has been the practice to interpose a layer of refractory material such as diatomaceous earth. The latter material is heavier and has a substantially higher K factor than either 85% magnesia or the present material, but even more important is the disadvantage arising from the need to use two different and separate materials (which often must be obtained from different sources) to provide a suitable insulation. The present invention, combining as it does in a single, low cost material, both refractoriness and high insulating efficiency, provides in effect a universal or all-purpose insulation which greatly simplifies problems of industrial insulation. For example, it dispenses with the necessity to determine in advance whether any temperatures are likely to exceed 600° F. and if so, to make special provision therefor.

Obviously, the invention is not limited to the details of the illustrative product or its process of manufacture since these may be variously modified. Moreover it is not indispensable that all features of the invention be used conjointly, since various features may be used to advantage in different combinations and subcombinations.

Having described my invention, I claim:

1. The method of making a material of the character described comprising mixing together in an excess of hot water Portland cement and a quantity of material of the group consisting of bentonite, attapulgite, aluminum hydroxide, precipitate, and asbestos fines sufficient to form a voluminous dispersion substantially to hold the particles of Portland cement in separated condition, agitating the mixture to secure initially a thorough distribution of said particles throughout said dispersion, allowing the mixture to rest, periodically repeating said agitation and rest periods to break up incipient bonding between said Portland cement particles until the particles of cement have substantially completely hydrated and have substantially lost their power to bond with like particles, said material containing some free lime after complete hydration of said Portland cement, molding said material and removing excess water, and then applying heat to cause the lime to form a bond.

2. The method of making a material of the character described comprising mixing together in an excess of hot water Portland cement and a quantity of material of the group consisting of bentonite, attapulgite, aluminum hydroxide precipitate, and asbestos fines sufficient to form a voluminous dispersion substantially to hold the particles of Portland cement in separated condition, agitating the mixture to secure initially a thorough distribution of said particles throughout said dispersion, allowing the mixture to rest, periodically repeating said agitation and rest periods to break up incipient bonding between said Portland cement particles until the particles of Portland cement have substantially completely hydrated, and then molding the material to bond the particles together.

3. The method of making a material of the character described comprising mixing together in an excess of water Portland cement and a quantity of bentonite sufficient to form a voluminous dispersion substantially to hold the particles of Portland cement in separated condition, agitating the mixture to secure initially a thorough distribution of said particles throughout said dispersion, allowing the mixture to rest, periodically repeating said agitation and rest periods to break up incipient bonding between the said Portland cement particles until the particles of cement have substantially completely hydrated and have lost their power to cement together, and then removing the water.

4. The method of making a material of low bulk density which comprises mixing together in an excess of water: (1) powdered mineral substances which in the presence of water form a calcium salt of the group consisting of silicates and aluminates of calcium, and (2) a quantity of material of the class consisting of bentonite, attapulgite, aluminum hydroxide precipitate, and asbestos fines, sufficient to form a voluminous dispersion substantially to hold the calcium salt forming particles in separated condition, agitating the mixture to secure initially a thorough distribution of said particles throughout said dispersion, allowing the mixture to rest, periodically repeating said agitation and rest periods to break up incipient bonding between the said particles until the formation of said calcium salt particles has been substantially completed and the particles have substantially lost their power to bond with like particles, said mixture having some free lime after the formation of said particles, removing excess water and molding said material, and then applying heat to cause the said free lime to form a bond.

5. The method of making a material of low bulk density which comprises mixing together in an excess of hot water: (1) powdered mineral substances which in heated condition in the presence of water form a calcium salt of the group consisting of silicates and aluminates of calcium and (2) a material of the class consisting of bentonite, attapulgite, aluminum hydroxide precipitate, and asbestos fines which when hydrated and dispersed in water form a voluminous dispersion, maintaining the calcium salt forming particles throughout their reaction in separated condition by means of said voluminous dispersion to prevent such substantial contact between said particles as might result in permanent bonding of like particles together, periodically agitating the mixture and thereafter allowing it to rest during formation of said particles until substantial completion of the reaction, and then removing the water.

6. The method of making a material of the character described which comprises combining mineral particles which in heated condition with an excess of hot water react to form a calcium salt of the group consisting of silicates and aluminates of calcium with a slurry comprising an excess of hot water and a quantity of a material of the class consisting of bentonite, attapulgite, aluminum hydroxide precipitate, and asbestos fines sufficient to form a voluminous dispersion to maintain said particles out of bonding contact with each other throughout their reaction, mixing the materials in said slurry to secure initially a thorough distribution of said particles throughout said dispersion, allowing the mixture to remain relatively quiescent but periodically agitating the mixture sufficiently to restore distribution of the particles and to break up incipient bonding of particles together, continuing said alternate quiescent and agitation periods until the particles substantially no longer have the power to bond together, and then removing the excess water.

7. The method of making a material of the character described which comprises combining in excess of hot water Portland cement and bentonite in the ratio by weight of about 5 to 1, to form a slurry, mixing the materials in said slurry to secure initially a thorough distribution of the cement particles throughout the dispersion of bentonite, allowing the mixture to remain relatively quiescent but periodically agitating the mixture sufficiently to restore distribution of the particles of cement and to break up incipient bonding of the particles of cement together, continuing said alternate quiescent and agitation periods until the particles of cement have substantially completely hydrated and substantially no longer have the power to cement together, removing excess water and then molding the material to bond the material into a coherent mass.

8. A mass of Portland cement particles held in substantially separated condition by a voluminous mass of hydrated dispersing agent of the group consisting of bentonite, attapulgite, aluminum hydroxide precipitate, and asbestos fines, said particles of cement being substantially completely hydrated so as no longer to have the power to bond together by the normal cementing action of the Portland cement itself.

9. A mass of Portland cement particles held in substantially separated condition by a voluminous mass of bentonite, said particles of cement being substantially completely hydrated so as not to have the power to bond together by the normal cementing action of Portland cement itself, said mass containing a small amount of long fiber asbestos for strengthening the mass.

HENRY NAPIER.

REFERENCES CITED

The following references are of record in the file of this patent:

UNITED STATES PATENTS

| Number | Name | Date |
|---|---|---|
| 1,226,779 | Lappen | May 22, 1917 |
| 1,520,893 | Teitsworth | Dec. 30, 1924 |
| 1,574,363 | Calvert | Feb. 23, 1926 |
| 1,755,502 | Collings | Apr. 22, 1930 |
| 1,770,767 | Collings | July 15, 1930 |
| 1,932,971 | Huttemann et al. | Oct. 31, 1933 |
| 2,023,511 | Brosius | Dec. 10, 1935 |
| 2,156,311 | Schuh | May 2, 1939 |
| 2,339,041 | Abrahams | Jan. 11, 1944 |

FOREIGN PATENTS

| Number | Country | Date |
|---|---|---|
| 501,024 | Great Britain | 1939 |